(12) United States Patent
Wallen et al.

(10) Patent No.: US 8,353,203 B2
(45) Date of Patent: Jan. 15, 2013

(54) BRAKE POSITION SENSOR UNIT

(75) Inventors: Gregory T. Wallen, Roscoe, IL (US);
Mark D. Miller, Rockford, IL (US);
James M. Regan, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 755 days.

(21) Appl. No.: 12/537,302

(22) Filed: Aug. 7, 2009

(65) Prior Publication Data

US 2010/0095754 A1 Apr. 22, 2010

Related U.S. Application Data

(60) Provisional application No. 61/106,208, filed on Oct. 17, 2008.

(51) Int. Cl.
*G01L 5/28* (2006.01)
(52) U.S. Cl. .......................................... 73/121
(58) Field of Classification Search ...... 73/121
See application file for complete search history.

(56) References Cited

U.S. PATENT DOCUMENTS

| 2,951,540 | A | * | 9/1960 | Hawkins | 192/13 R |
| 3,701,401 | A | * | 10/1972 | Palma et al. | 188/134 |
| 3,935,757 | A | | 2/1976 | Granberg | |
| 4,318,304 | A | * | 3/1982 | Lang | 74/89.38 |
| 4,603,594 | A | * | 8/1986 | Grimm | 74/89.39 |
| 4,784,244 | A | * | 11/1988 | Carre et al. | 188/156 |
| 5,430,361 | A | * | 7/1995 | Wells | 318/630 |
| 5,484,043 | A | * | 1/1996 | Quick et al. | 188/187 |
| 5,785,158 | A | * | 7/1998 | Grimm | 188/181 T |
| 6,322,161 | B1 | * | 11/2001 | Maslonka et al. | 303/89 |
| 7,428,846 | B2 | * | 9/2008 | Vukovic | 73/862.328 |
| 7,808,374 | B2 | * | 10/2010 | Schmitt et al. | 340/454 |

FOREIGN PATENT DOCUMENTS

GB 575263 12/1942

OTHER PUBLICATIONS

UK Search Report and Examination Report for GB0918309.6 (5 pages).

* cited by examiner

*Primary Examiner* — Lisa Caputo
*Assistant Examiner* — Jamel Williams
(74) *Attorney, Agent, or Firm* — Carlson, Gaskey & Olds PC

(57) ABSTRACT

A brake position sensor unit includes a unitary brake shaft that transmits braking torque to a article to be slowed, connects directly to a brake unit, connects to a resolver and has a plurality of planetary gears rotating thereabout to activate a sensor when the brake unit is set.

6 Claims, 4 Drawing Sheets

BRAKE POSITION SENSOR UNIT

BACKGROUND OF THE INVENTION

The application claims priority to U.S. Provisional Application No. 61/106,208 which was filed on Oct. 17, 2008.

Prior art brake sensors are typically used with an electromagnetic brake that has a failsafe feature that activate springs to apply the brake if an electromagnetic field that opposes the force of the springs fails. To deactivate the brake, the electromagnetic field pulls the brake parts apart. A resolver is typically used to communicate with a controller to inform the aircraft of the brakes position. A brake verification mechanism may be used with the brake sensor to determine whether a brake is in use.

SUMMARY OF THE INVENTION

According to the invention, a brake position sensor unit includes a brake shaft that transmits braking torque to an article to be slowed, connects directly to a brake unit, connects to a resolver and has a plurality of planetary gears rotating thereabout to activate a brake verification mechanism ("BVM") if the brake unit is set.

According to an aspect of the invention, the BVM is used to verify the brake is set in a take-off environment.

These and other features of the present invention can be best understood from the following specification and drawings, the following of which is a brief description.

DETAILED DESCRIPTION OF THE INVENTION

Figure 1:
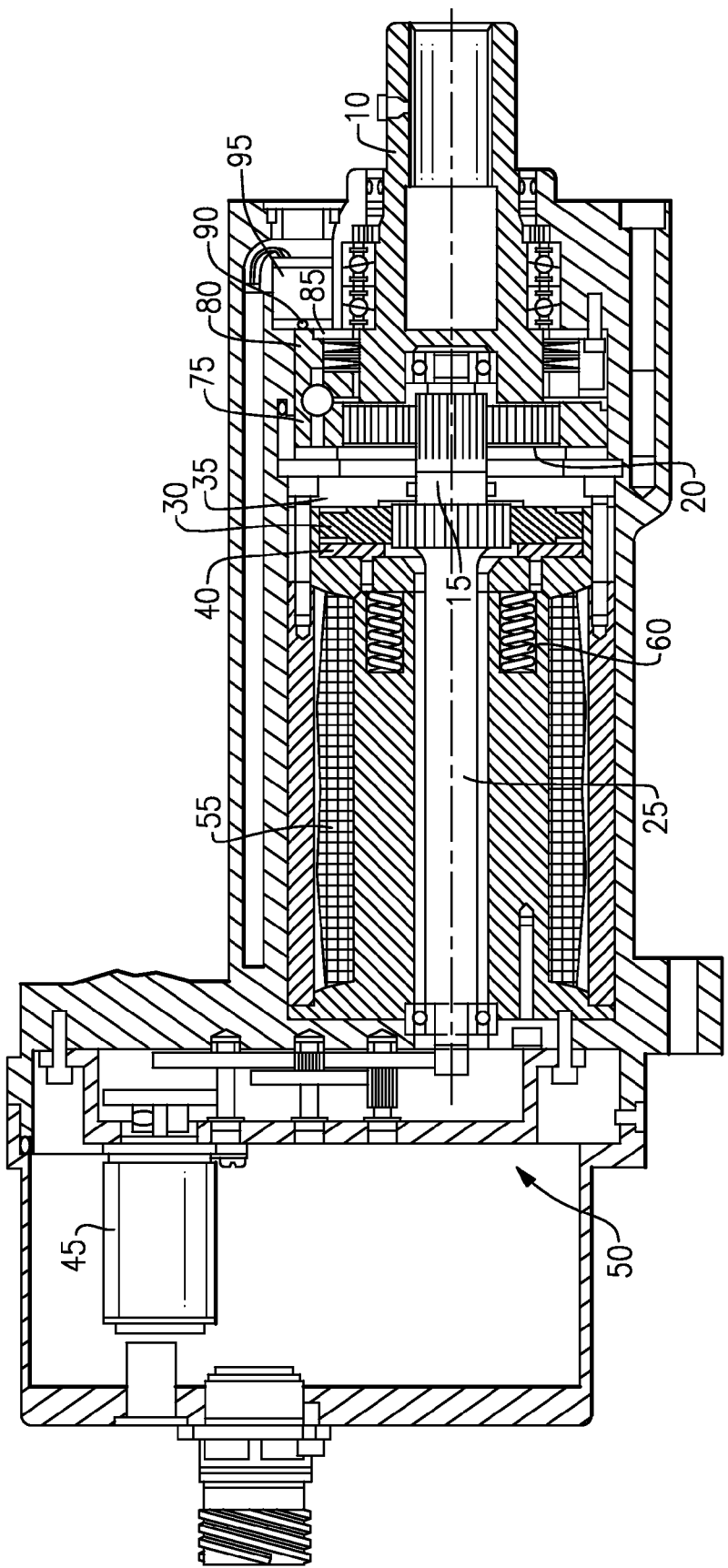
FIG. 1 is a prior art sectional view of a brake for an aircraft.
Figure 5:
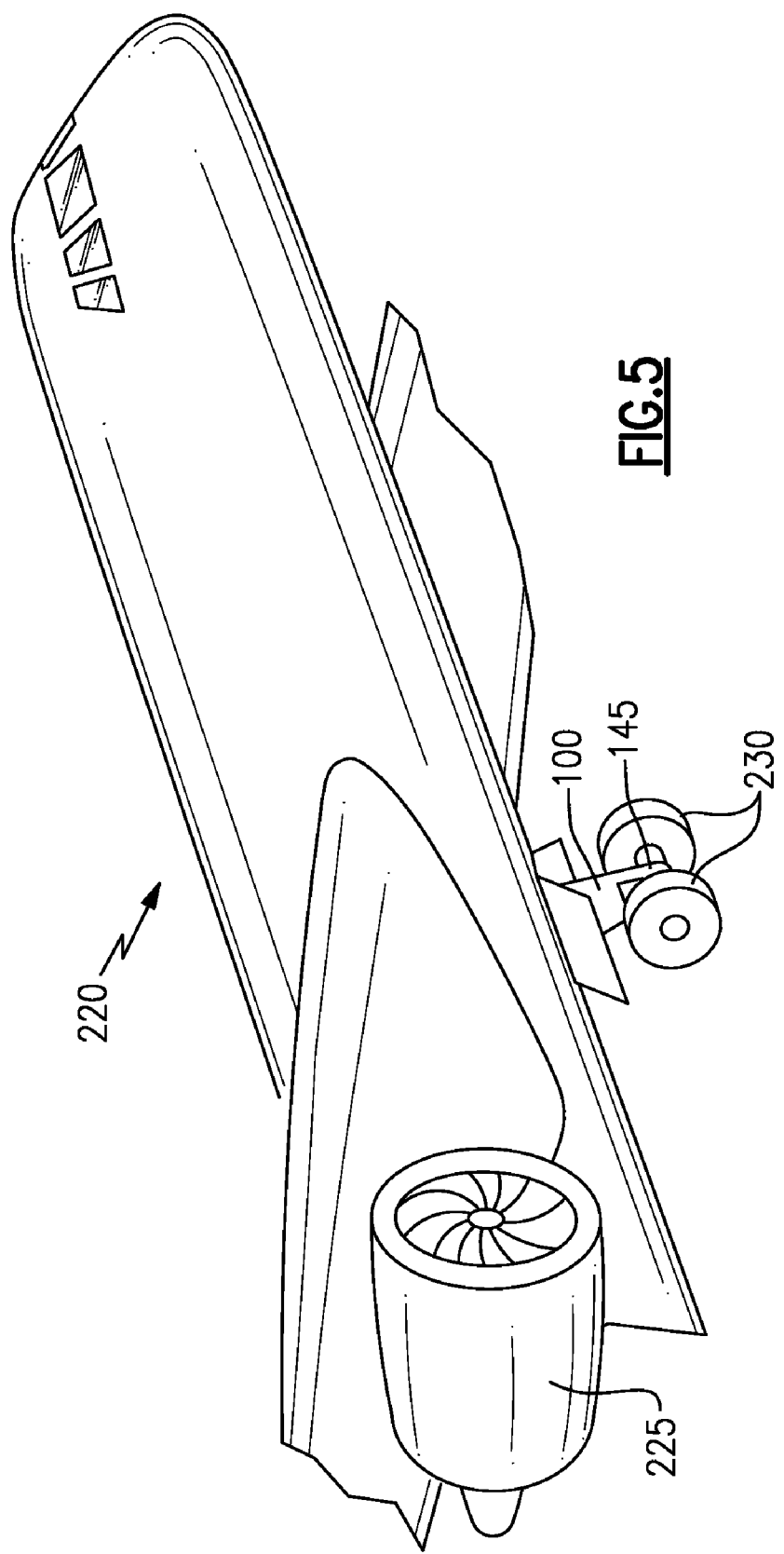
FIG. 5 is a schematic view of the brake unit shown in FIG. 2 in a non-limiting embodiment.

Referring to a prior brake sensor FIG. 1 is shown. A shaft 10 is attached to an item to be braked such as an aircraft slat, flap (not shown) or wheel 230 (see FIG. 5). A plurality of planetary gears 20 attached to shaft 10 rotates a sun gear 15 that is attached to a separate brake shaft 25. The brake shaft in turn rotates a brake plate 30 disposed between a clapper plate 40 and a thrust washer 35. The brake shaft also rotates a resolver 45 through a series of gears 50. The resolver communicates the position of the brake shaft 25 to an electronic controller (not shown) and, in view of the connections noted hereinabove, the item to be positioned such as a wheel etc. (See FIG. 5).

If voltage applied to the windings 55 is removed, a plurality of springs 60 force the clapper plate 40 against the brake plate 30 (which in turn engages the thrust washer 35) that is directly attached to the brake shaft 25 to stop the rotation of the brake shaft.

With the brake shaft 25 stopped and the brake engaged, if torque is applied to shaft 10, the planetary gears 20 continue to rotate around the sun gear 15 until a ball ramp 75 drives a translating ball ramp 80 against a housing shoulder 85 and activates a switch 90. The planetary gears multiply the braking torque on the shaft 10 about four fold upon freeing the springs 60. At this point, the controller (not shown) is alerted, via a switch 90 that the brake is activated and the torque applied to shaft 10 is removed.

Figure 2:
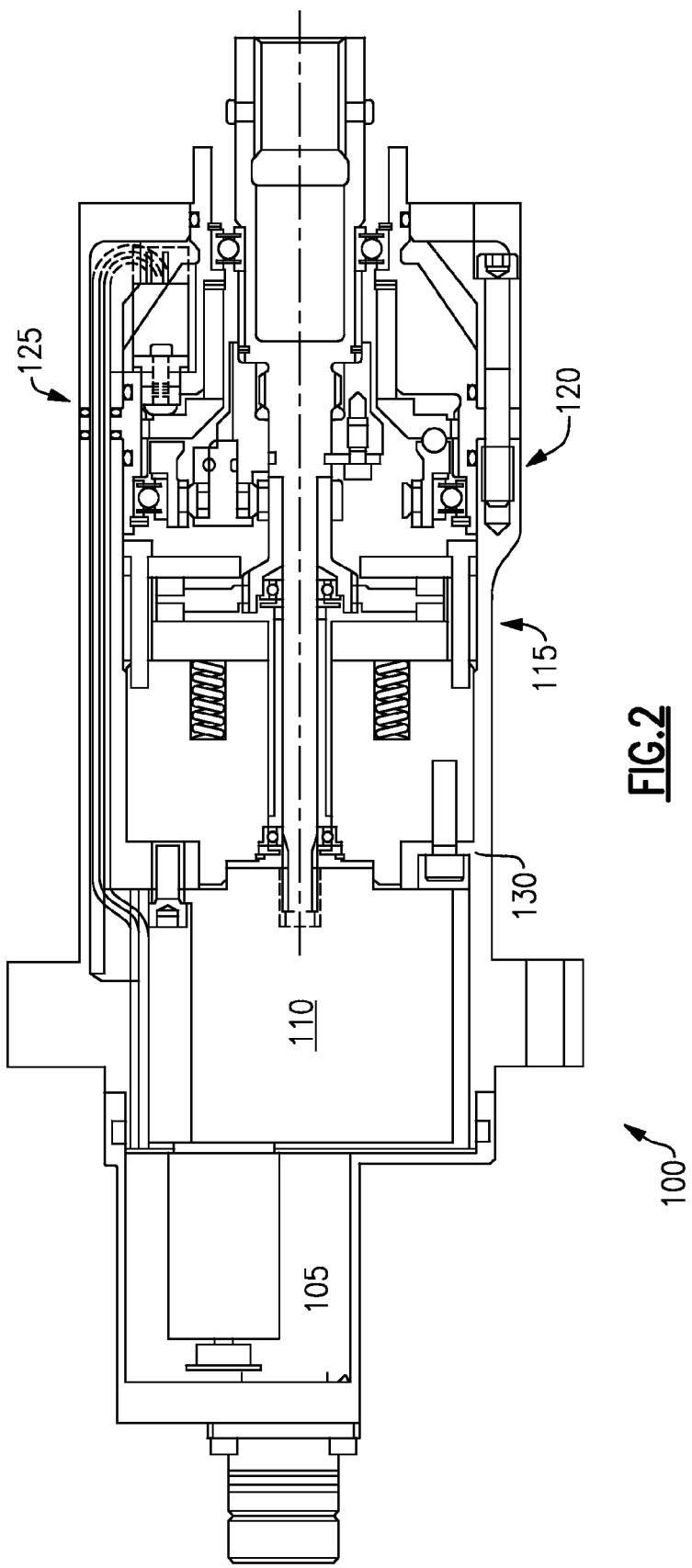
FIG. 2 shows a brake unit including a sectional view of the brake position sensor of the invention.

Referring to FIG. 2, the brake sensor unit 100 of the invention includes a resolver 105, a gear section 110, a brake portion 115, planetary gears 120 and a brake verification mechanism (e.g., "BVM") 125. The resolver portion, gear section, brake section, planetary gears and BVM are disposed within housing 130. A shaft 145 attaching to the gear section 110, the brake portion (as will be discussed herein), and the planetary gears 120 extends outwardly from the housing 130 and attaches to an item to be braked such as an aircraft flap (not shown) or wheel 230.

The gear section 110 and resolver 105 used in the present invention are known in the art and may be acquired from BVR Technologies.

Figure 3:
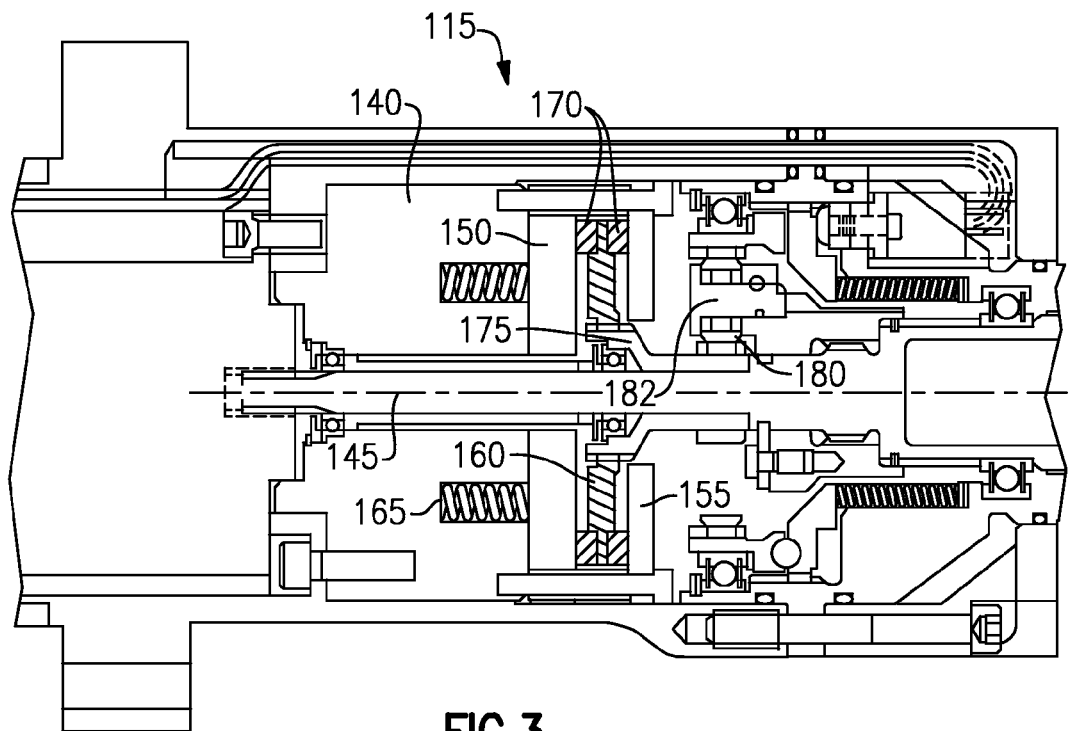
FIG. 3 is a close-up of a brake assembly of FIG. 2.

Referring now to FIGS. 2 and 3, the brake portion 115 is described. The brake portion includes an electromagnetic coil 140, which is disposed around shaft 145, a translating pressure (clapper) plate 150 that is also maintained around the shaft, a stationary pressure plate 155, and a rotating brake plate 160. Springs 165 are disposed within the electromagnetic coil as is known in the art. The rotating brake plate 160 has brake material 170 disposed thereon. The brake plate rotates with sun gear 175 that is disposed about the shaft 135. If the brake is activated, the electromagnetic coil is deactivated and springs 165 urge the translating pressure plate 150 into contact with the brake plate 160 which in turn engages the stationary pressure plate 155. The brake material 170 disposed the brake plate 160 stops the brake shaft from rotating. As the brake shaft slows, planetary gears 180 rotate relative to the brake shaft also around sun gear 175.

Figure 4:
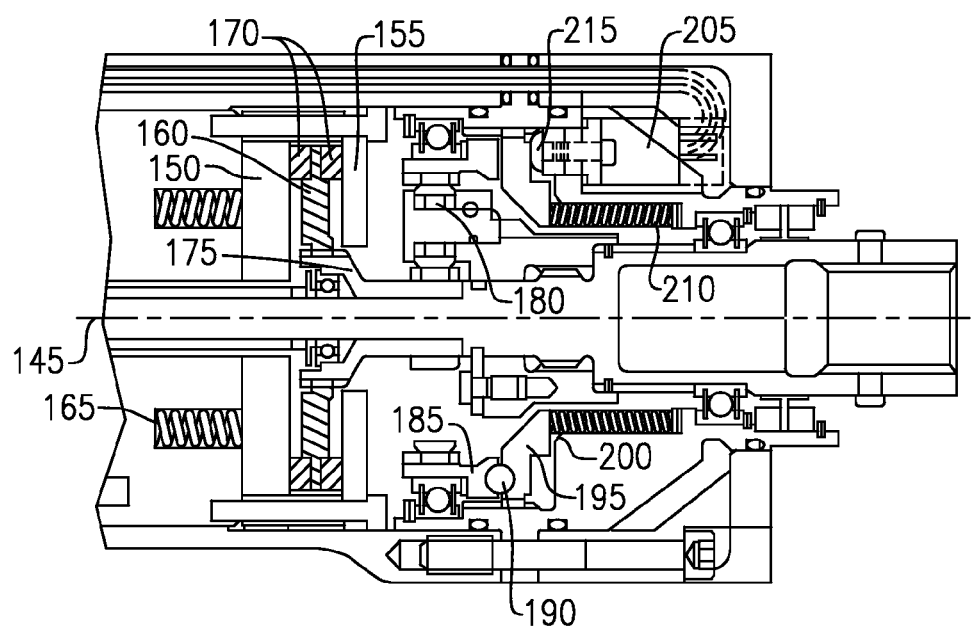
FIG. 4 is a close-up of the planetary gear head and brake verification mechanism of FIG. 2.

Referring now to FIG. 4, the planetary gears 180, which rotate on planetary pins 182, rotate a ball ramp 185 thereby causing a ball(s) 190 to move relative to the ball ramp and force a translating ball ramp 195 to move axially away from the ball ramp 185 until it engages a corner of the housing 200 at which point the shaft ceases to move. While the translating ball ramp moves it also engages a switch a microswitch 205 which forms the primary piece of the BVM 125.

Spring 210 acts to reset the translating ball ramp to a normal operating position if torque is removed from shaft 145.

The microswitch 205 has a nipple 215 that has a travel length that is ten times longer than the length of travel of the microswitch of the prior art so that there is increased reliability given the forces encountered within the brake.

By disconnecting the shaft 145 from the planetary gears that drive the brake shaft 25 (see FIG. 1), and allowing the brake shaft to attach directly to the gear section 110 and therefore the resolver 105, the resolver now rotates more than four times slower than the resolver of the prior art thereby increasing the reliability of the resolver. The gear section 110 is such that the resolver does not rotate more than one revolution for the length of travel of a slat, flap or a wheel while being braked.

In operation of the braking system is activated and an object to be braked, such as a wheel 230 is held from rotation by the brake portion 115. The nipple 215 is being pressed by the translating ball ramp 195 and the controller then knows that the brake portion 115 is engaged. An aircraft 220 may then build thrust in its engines 225 to test the engines or prepare for take-off. If take-off is desired, the electromagnetic coil 140 pulls the translating pressure plate 150 away the brake plate 160 and the shaft 145 is released. As the brake shaft rotates, the springs urge the translating ball ramp 195 towards the ball ramp 185 away from the nipple 215 of the microswitch 205. If this does not occur, the controller knows the brake has not released and appropriate action is taken to avoid damage to the brake sensor unit 100.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A brake verification mechanism ("BVM") for use with an article in an aircraft said mechanism comprising:
    a shaft that transmits braking torque directly to said article to be controlled;
    a brake mechanism connecting directly to said shaft for braking said shaft; and
    a planetary gear rotating about and driven by said shaft to activate a verification mechanism that transmits a signal if the brake shaft is braked.

2. The BVM of claim 1 further comprising:
    a ball ramp driven by said planetary gear;
    a translating ball ramp that is driven axially by a ball if there is a differential between a speed of said ball ramp and a speed of said translating ball ramp; and
    a microswitch that is activated if said translating ball ramp is driven away from said ball ramp by said differential.

3. The BVM of claim 1 wherein said article is a wheel, slat or flap.

4. The BVM of claim 1 further comprising a resolver directly attaching to said shaft.

5. Method of using a BVM in an aircraft, said method comprising:
    maintaining stationary a shaft that transmits braking torque to an article to be slowed by activating a brake mechanism connecting directly to said shaft; and
    maintaining stationary a planetary gear that rotates about said shaft to send a signal that the shaft is braked.

6. The method of claim 5 wherein said method further comprises:
    releasing said shaft if said aircraft is ready for takeoff; and
    sending a signal that said shaft is not braked.

* * * * *